United States Patent Office 3,850,840
Patented Nov. 26, 1974

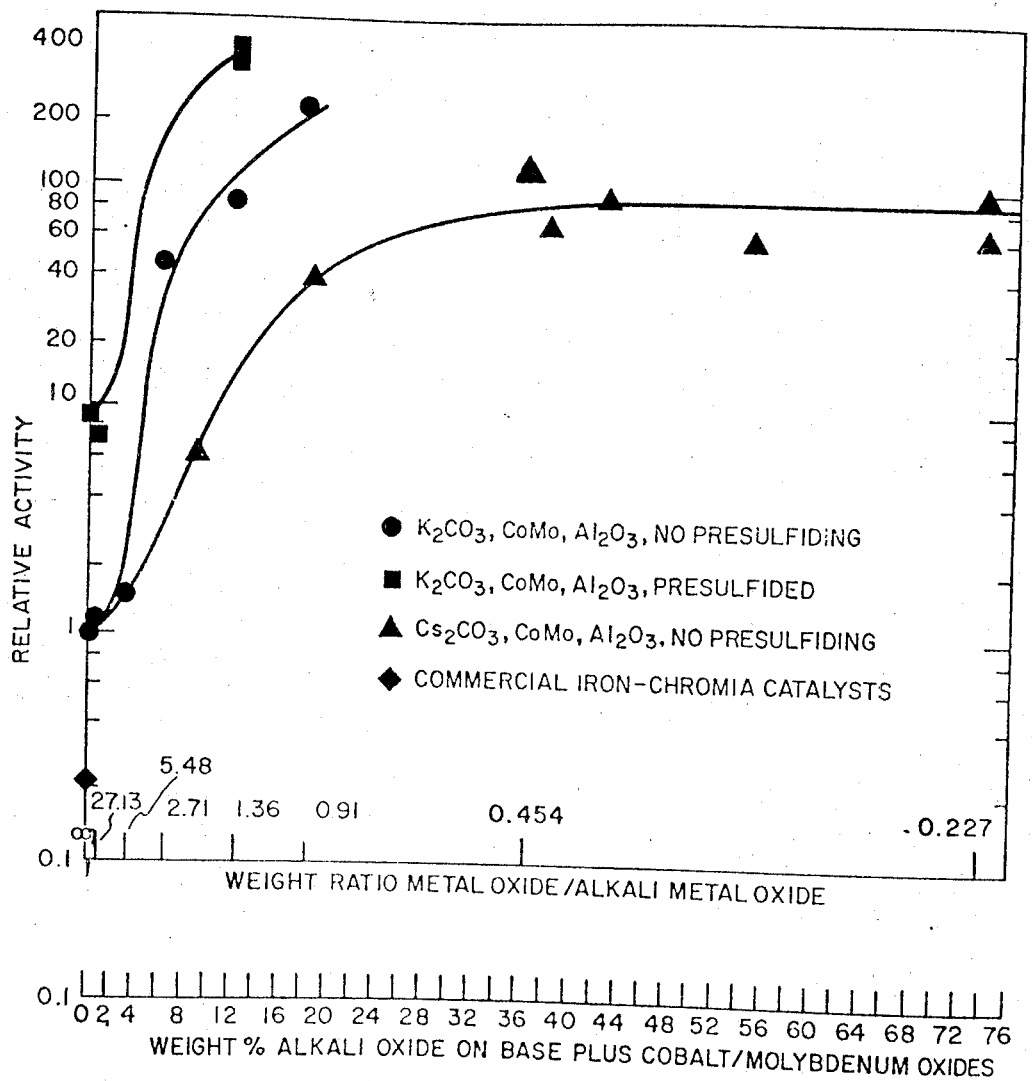

3,850,840
WATER GAS SHIFT PROCESS
Clyde L. Aldridge, 6022 S. Pollard Parkway, Baton Rouge, La. 70808, and Theodore Kalina, 16 Sunrise Drive, Morris Plains, N.J. 07950
Continuation-in-part of abandoned application Ser. No. 875,243, Nov. 10, 1969. This application Feb. 11, 1972, Ser. No. 225,632
Int. Cl. C01b 1/03, 2/06; C10k 3/04
U.S. Cl. 252—373
15 Claims

ABSTRACT OF THE DISCLOSURE

Hydrogen is produced by reacting steam with carbon monoxide in a multiple stage operation.

The gas mixture is first contacted with a high temperature water gas shift catalyst at a temperature of about 600° to about 1000° F. and then contacted with a second catalyst at a temperature of about 300° to about 700° F. A typical high temperature water gas shift catalyst, such as chromia promoted iron may be employed as the first catalyst, and the second catalyst comprises (1) an alkali metal compound derived from an acid having an ionization constant less than $1 \times 10^{-3}$ and (2) a hydrogenation-dehydrogenation component consisting of at least one element selected from the group consisting of the elements of Groups V–B, VI–B and VIII of the Periodic Table of Elements, the weight ratio of said hydrogenation-dehydrogenation component to said alkali metal compound, each calculated on the basis of the oxide thereof, being in the range of about 0.001:1 to about 10:1.

CROSS-REFERENCE TO RELATED APPLICATION

This application is a continuation-in-part of Ser. No. 875,243, filed Nov. 10, 1969 and now abandoned.

BACKGROUND OF THE INVENTION

This invention relates to the production of hydrogen from synthesis gas mixtures comprising carbon monoxide and steam.

Hydrogen is generally prepared in a two-step process in accordance with the following equation:

$$C + H_2O \rightleftharpoons CO + H_2$$
$$CO + H_2O \rightleftharpoons CO_2 + H_2$$

In the first step, steam is reacted with a light hydrocarbon at about 1200° to 1600° F., or with a heavy hydrocarbon, coal or coke at temperatures up to about 2500° F., with or without injection of oxygen or air. The resulting synthesis gas mixture, which contains carbon monoxide and hydrogen, is reacted in the second step with more steam at lower temperatures in the presence of a suitable catalyst. The second step, known as the water gas shift reaction, is limited by equilibrium considerations and complete conversion of CO to $CO_2$ is not realized. Moreover, the concentration of CO in the product at equilibrium is highly dependent upon the temperature, lower temperatures shifting the reaction to the right with increased production of hydrogen. Consequently, conversions can be increased by either removing the carbon dioxide and again contacting the CO and steam with the catalyst in the same or subsequent stages, or by lowering the temperature.

The effect of temperature on the equilibrium constant,

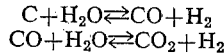

$$K = \frac{(CO_2)(H_2)}{(CO)(H_2O)}$$

is shown in the following table:

TABLE I

| °F. | K | Concentration of CO at equilibrium (dry basis) feed* | |
|---|---|---|---|
| | | A | B |
| 900 | 5.61 | 7.5 | 2.9 |
| 800 | 9.03 | 5.3 | 1.9 |
| 700 | 15.89 | 3.4 | 1.1 |
| 600 | 31.44 | 1.9 | 0.6 |
| 500 | 72.75 | 0.9 | 0.2 |
| 400 | 206.80 | 0.3 | 0.1 |

*A=50% of a 1/1 $H_2$/CO mixture plus 50% $H_2O$ (steam).
B=30% of a 1/1 $H_2$/CO mixture plus 70% $H_2O$ (steam).

It is thus evident that less CO will remain unconverted and costly methods of operation will be avoided by operating at as low temperatures as possible, e.g., 300° to 700° F., preferably 400° to 600° F. Such low temperatures can be employed by the use of a catalyst consisting of copper deposited on zinc oxide. Unfortunately, however, this catalyst will not tolerate even traces of sulfur in the feed. Since coal and coke and heavy hydrocarbon feeds suitable for conversion to hydrogen contain appreciable amounts of sulfur, e.g., up to 5 to 10 weight percent, which is converted to hydrogen sulfide and even some small amounts of carbon disulfide and carbonyl sulfide, these feeds are precluded from use with the Cu-ZnO catalyst, and are limited to shift temperatures of about 650° to 950° F. using a sulfur resistant catalyst such as $Fe_2O_3$ promoted with $Cr_2O_3$.

A considerable improvement in the water gas shift reaction has been made with the development of a novel catalyst comprising (1) at least one alkali metal compound derived from an acid having an ionization constant less than $1 \times 10^{-3}$ and (2) a hydrogenation-dehydrogenation component consisting of at least one element selected from the group consisting of the elements of Groups V–B, VI–B and VIII of the Periodic Table of Elements, in which the weight ratio of said hydrogenation-dehydrogenation component to said alkali metal compound, each calculated on the basis of the oxide thereof, is in the range of about 0.001:1 to about 10:1. The second stage catalyst is more fully described in the copending application of Clyde L. Aldridge. Ser. No. 152,584, filed June 14, 1971 which is a continuation-in-part of Ser. No. 821,452, filed May 2, 1969, the disclosures of said applications being incorporated herein by reference. This new catalyst has the advantage of not being poisoned by sulfur, which is normally present in synthesis gas feeds, and yet having activity at low temperatures, e.g., temperatures in the range of about 200° to about 700° F.

Shift catalysts containing metallic hydrogenation-dehydrogenation components in combination with minor amounts of alkali metal materials have been described in British Pat. 961,860 and U.S. 3,529,935. Numerous other references exist that disclose catalyst combinations composed of heavy metal constituents with alkali compounds. Exemplary of such teachings are the disclosures of Switzerland Pat. 69,336; U.S. 1,330,772; U.S. 3,518,-208; U.S. 3,490,872; U.S. 1,896,840; U.S. 2,147,780; U.S. 2,364,562; Ztschr. Elektrochem 44 (1938), pp. 577–578; Netherlands application 6601536; Japanese Pat. 129,729; Russian Pat. 67,942; French Pats. 777,546 and 815,351; Austrian Pats. 149,657 and 153,165; German Pat. 706,-868; Belgian Pat. 659,421 and Simck et al., Zprary Ustova Ved. Vyk. Uhli Praze, 2 (1935) pp. 113–128 (see also Chem. Abs., 30 (1936)).

SUMMARY OF THE INVENTION

It has now been found that hydrogen can be produced by contacting a synthesis gas mixture containing carbon monoxide with steam in the presence of a first catalyst, then contacting the partially converted gas mixture with a second catalyst to form a gas mixture rich in hydrogen and containing only small amounts of CO. The first catalyst may be a conventional high temperature water gas shift catalyst such as the aforedescribed chromia-promoted iron oxide, and the second catalyst is a composition comprising (1) an alkali metal compound derived from an acid having an ionization constant less than $1 \times 10^{-3}$, and (2) a hydrogenation-dehydrogenation component comprising at least one element selected from the group consisting of the elements of Groups V–B, VI–B and VIII of the Periodic Table of Elements. Contact with either the first or the second catalyst, or both, can be carried out in a plurality of stages. In accordance with the present invention, the desirable high temperature properties of a conventional high temperature catalyst are utilized, yet the overall process is carried out with much less steam consumption than would be possible using a high temperature catalyst alone.

DESCRIPTION OF THE PREFERRED EMBODIMENT

This invention will now be further described with reference to a preferred embodiment of the invention as shown in the figure.

Referring to the figure, a hot synthesis gas stream containing carbon monoxide, hydrogen, steam, and small amounts of hydrogen sulfide, e.g., about 0.1 volume percent up to about 1.5 volume percent, is continually passed through line 10, waste heat boiler 11, and quench vessel 12, where it is quenched with water added through inlet 12a. The quenched stream then passes through a pair of heat exchangers 13 and 14 into first converter inlet line 15, and hence into the first shift converter 16 which contains a conventional high temperature catalyst, such as chromia-promoted ferric oxide. The temperature of the synthesis gas mixture in line 15 (at the reactor inlet) is typically about 600° to 1000° F., e.g., about 675° F. The reaction taking place in the first shift converter 16 is exothermic, and a temperature rise from about 675° to about 900° or 950° F. is typical. At least a portion of the effluent from converter 16 passes via outlet line 17 through heat exchanger 14, is then mixed with additional steam added through line 18, and passes via second converter inlet line 20 into the second shift converter 21. The second shift converter also contains a conventional high temperature catalyst such as chromia-promoted ferric oxide. The reaction taking place in the second shift converter 21 is exothermic and a temperature rise from about 675° F. to about 900° F. is typical. At least a portion of the second converter effluent is passed through outlet line 22, heat exchanger 13, line 23, waste heat boiler 24, third converter inlet 25, and then to the third shift converter 26. The temperature in the third converter inlet line 25 is typically between 300° and 700° F. This third shift converter 26 contains the second catalyst, which is a composition comprising (1) an alkali metal compound derived from an acid having an ionization constant less than $1 \times 10^{-3}$ and (2) from about 0.001 to about 10 parts by weight, per weight of alkali metal compound, each calculated on the basis of the oxides thereof, of a hydrogenation-dehydrogenation component comprising at least one element selected from the group consisting of the elements of Groups V–B, VI–B and VIII of the Periodic Table of Elements. Shifted synthesis gas is withdrawn from converter 26 through outlet line 27. This shifted synthesis gas is rich in hydrogen and contains only trace amounts of carbon monoxide. The carbon dioxide and steam contents of this shifted synthesis gas may be removed by conventional means.

Process steam which is added through line 18 is supplied from manifold 28, which in turn is supplied by steam lines 29 and 30. Steam in line 29 is generated from water in waste heat boiler 11 and steam in line 30 is generated from water in waste heat boiler 24. The amount of steam required for cooling the synthesis gas stream in waste heat boilers 11 and 24 exceeds the amount of process steam added through line 18. The excess steam in manifold is conveyed to suitable locations of use through export steam line 31.

According to a preferred mode of operation, a mixture of synthesis gas and steam is converted to hydrogen and carbon dioxide as shown in the accompanying drawing, and typical gas compositions (based on 100 moles of dry synthesis gas feed in line 15) and temperatures are as shown in Table II below:

TABLE II

|  | Location* | | | | | | |
|---|---|---|---|---|---|---|---|
|  | 15 | 17 | 18 | 20 | 22 | 25 | 27 |
| $H_2$ | 44.2 | 62.2 | | 62.2 | 81.6 | 81.6 | 90.2 |
| CO | 48.7 | 30.7 | | 30.7 | 11.3 | 11.3 | 2.7 |
| $CO_2$ | 5.2 | 23.2 | | 23.2 | 42.6 | 42.6 | 51.2 |
| $N_2+CH_4+H_2S$ | 1.9 | 1.9 | | 1.9 | 1.9 | 1.9 | 1.9 |
| $H_2O$ | 33.3 | 15.3 | 65.1 | 80.4 | 52.4 | 52.4 | 52.4 |
| Total | 133.3 | 133.3 | 65.1 | 198.4 | 189.8 | 189.8 | 198.4 |
| Temp., °F | 675 | 950 | | 675 | 875 | 450 | 540 |

*Refers to reference numerals in drawing.

Saturated steam at 500 to 600 p.s.i.g. is supplied to the process via line 18.

A preferred catalyst in the third stage converter 26 consists of a sulfided mixture of 13.8% by weight $K_2CO_3$, 3.0% by weight CoO, 10.8% by weight $MoO_3$, and 72.4% by weight of a gamma alumina carrier having a surface area of about 250 square meters per gram. An alternate catalyst composition which gives essentially the same results, consists of a sulfided mixture of 10.0% by weight $K_2CO_3$, 1.4% by weight CoO, 6.2% by weight $MoO_3$, and 82.4% by weight of alpha-alumina having a surface area of 5 square meters per gram. The conventional iron-chromium catalyst used in the first and second shift converter typically contains about 13% by weight $Cr_2O_3$, balance $Fe_2O_3$, although other iron-chromium compositions may be used.

The present invention makes it possible to achieve substantially complete conversion of carbon monoxide to carbon dioxide without intermediate $CO_2$ removal at low temperatures, an accomplishment which has heretofore been impossible in the presence of sulfur. These results are obtained in accordance with the present invention by carrying out the reaction in the additional presence of 0.001 to 10 parts by weight of a hydrogenation-dehydrogenation catalyst component per weight of alkali metal compound, calculated on the basis of the oxides thereof, without reference to any support which may be used. The use of these catalysts in conjunction with the alkali metal salt enables more complete conversion of the carbon monoxide to carbon dioxide even in the presence of sulfur and thus affords vast economic savings since a costly step of removing the carbon dioxide is avoided. While it is not intended to be limited by any theory concerning the mechanism of the reaction, it is believed that the alkali metal component in the presence of water vapor exists as a liquid phase in contact with the surface of the hydrogenation-dehydrogenation component. It is believed that the aqueous alkali metal phase converts the carbon monoxide to formate and the hydrogenation-dehydrogenation catalyst surface converts the formate into $CO_2$ and $H_2$. Thus, the interaction between the two types of catalysts brings about a vast synergistic effect on catalytic activity.

Suitable alkali metal components include the carbonate, bicarbonate, biphosphate, sulfide, hydrosulfide, silicate, bisulfite, aluminate, hydroxide, tungstate, etc., of sodium, potassium, lithium, rubidium and cesium. In addition, the alkali metal salts of organic acids such as acetic acid, propionic acid, etc., are equally suitable. Actually, the alkali salt of any acid which has an ionization constant of less than about $1 \times 10^{-3}$ may be used. The potassium and cesium salts are most preferred.

It has been discovered that at least a portion of the weak acid alkali metal salts are converted to the corresponding alkali metal carbonate during the course of the shift reaction. Additionally, salts of relatively unstable strong acids, such as nitric acid, are also converted, at least partially, to the carbonate. Hence, in most instances, the ultimate catalyst specie is believed to be the alkali metal carbonate. Therefore, the alkali metal catalyst constituent may be any material that is at least partially converted to the alkali carbonate during the course of the shift reaction.

The hydrogenation-dehydrogenation component of the catalyst comprises one or more metal materials, preferably sulfided non-noble metals of Groups V–B, VI–B and VIII of the Periodic Table of Elements (designed by Henry D. Hubbard and revised 1956 by William F. Meggers of the National Bureau of Standards). Vanadium, molybdenum, tungsten, cobalt, tantalum and niobium (columbium) materials may be used alone or in admixture in any proportion. Further, vanadium, molybdenum, cobalt, tungsten, tantalum, niobium or mixtures thereof in combination with nickel, iron or chromium compositions are also effective hydrogenation-dehydrogenation components. When nickel, iron or chromium containing mixtures are employed, the nickel, iron and/or chromium constituent should not make up more than about 80 mole percent, preferably less than about 50 mole percent, of the total hydrogenation-dehydrogenation components. Examples of useful hydrogenation-dehydrogenation metals include cobalt, molybdenum, cobalt-molybdenum, molybdenum-chromium, tungsten-chromium, cobalt-nickel, cobalt-iron, molybdenum-tungsten, vanadium-tungsten, vanadium-cobalt, nickel-tungsten, vanadium, vanadium-tantalum, cobalt-niobium, niobium-iron, cobalt-nickel-iron, cobalt-nickel-molybdenum, tungsten-iron-nickel, etc.

If the above non-noble metals are used with sulfur-containing feeds, they may be used in the form of the oxide or other compound easily sulfided. These compounds are then sulfided in situ during the passage of a sulfur-containing feed ($H_2S$, organic sulfides, etc.) over them.

The chemical form of the catalyst metal materials is not critical. Preferably, the metal materials are in a form that can be at least partially reduced and/or sulfided, under shift reaction conditions. Cesium or potassium carbonate or acetate combined with cobalt-molybdenum materials is a particularly effective catalyst. Hereinafter, the hydrogenation-dehydrogenation catalyst component will be referred to as the metal without reference to its precise chemical composition. Under the reaction conditions the catalyst usually exists in a partially reduced and sulfided state which is difficult to define stoichiometrically, and thus a description using the active metallic elements is as accurate as any.

The catalytically active metal components may be used either supported or unsupported and in the former case the nature of the carrier is not critical. Suitable carriers include porous inorganic oxides such as gamma- and alpha-alumina. Other suitable support materials include silica; silica-alumina, e.g., silica-alumina cogel cracking catalysts; zeolites such as faujasite, erionite and the like; activated carbon; coconut charcoal, Columbia L carbon; magnesia; titania; zirconia; silicon carbide and the like. Particularly suitable gamma- and alpha-alumina catalyst supports are available commercially. Such supports may be prepared by a variety of methods. For example, they may be prepared by hydrolyzing an aluminum alcoholate which may have been prepared in accordance with the disclosures of U.S. Pat. No. 2,636,865. They may also be prepared by precipitating a hydrous alumina from an aqueous solution of an aluminum salt, preferably $AlCl_3$. A third method of preparation comprises dissolving metallic aluminum in weakly acidified water, preferably acidified with an organic acid, such as acetic acid, in the presence of mercury or compound thereof, and thereafter gelling the alumina sol thus formed. The hydrous alumina prepared by any of the foregoing procedures is subsequently dried and calcined at temperatures between 600° and 1200° F., preferably between 900° and 1000° F.

The catalyst components can be incorporated on the support in any conventional manner. Preferably, the hydrogenation-dehydrogenation components are placed in the support first. This may be done by impregnating the support with solutions of salts of the desired metals and then calcining, e.g., at 1000° to 1200° F., to convert the metal salts to the stable oxide forms. Then the alkali metal compound, e.g., cesium or potassium carbonate, is impregnated onto the support and the catalyst simply dried. In general, the carrier material is impregnated with a solution containing the desired compound.

Alternatively, the various components may be mixed by mechanical means, such as by dry mixing. Good catalysts can be obtained by fine milling of a cobalt-molybdenum catalyst supported on alumina and mixing the powder obtained with a powdered alkali metal compound such as cesium carbonate. The alkali metal compound may also be supported on a carrier if desired. The resultant mixture, after the addition of a lubricant such as stearic acid or graphite, is compressed into pellets which can be calcined and sulfided.

The weight ratio of hydrogenation-dehydrogenation component to alkali metal compound present in the catalyst is critical to the ultimate performance of the catalyst. Maximum catalyst activity is encountered when the ratio of metal component to alkali metal compound is less than 10:1, preferably less than about 5:1 and most preferably less than about 3:1, the weight ratios being calculated on the basis of the oxides of each constituent. Typically, from about 0.001 to about 5–10 parts by weight of hydrogenation-dehydrogenation component is used per part by weight of alkali metal compound. For purposes of calculating weight ratios, the metals are assumed to exist in only the following oxide forms, $CoO$, $MoO_3$, $WO_3$, $V_2O_5$, $Fe_2O_3$, $NiO$, $Cr_2O_3$, $Ta_2O_5$ and $Cb_2O_5$.

When a carrier is used, it may constitute any desired amount of the total catalyst composition, e.g., from 0 up to about 99.5% of the combined weight of alkali metal compound, hydrogenation - dehydrogenation component, and carrier. The amount of hydrogenation-dehydrogenation component used in the catalyst is not critical. Typically, a supported catalyst will be composed of about 0.1 to 35 wt. percent, preferably 5 to 20 wt. percent of the hydrogenation-dehydrogenation component measured on the basis of the oxide thereof.

Shift catalysts which have been found particularly effective consist of an alkali material, cobalt material and molybdenum material supported on gamma alumina. Particularly suitable catalysts contain from about 0.1 to about 10% by weight, preferably 1 to 5 wt. percent cobalt (oxide basis) and from about 1 to about 25% by weight preferably 5 to 15 wt. percent molybdenum (oxide basis), based on the combined weights of the cobalt material, molybdenum material, alkali constituent and carrier.

The low temperature catalyst system is particularly effective when at least a portion of the hydrogenation-dehydrogenation component and/or alkali metal component, is present in a sulfide form. The catalyst metals may be sulfided after catalyst formation and prior to contact with the steam and carbon monoxide. Alternatively, the catalyst metals may be sulfided in situ, through contact with sulfur bearing constituents present in the process feedstock. It should be recognized that the low temperature shift catalyst used herein can be employed with advantage when the catalyst metals are not present in a sulfide form. Generally, however, the conversion of any part of the catalyst metals to a sulfide form will have a beneficial effect on catalyst activity.

A preferred laboratory catalyst metals sulfiding procedure involves contacting a 10 cubic centimeter volume of catalyst with a feed gas mixture composed of approximately 52 volume percent carbon monoxide, 47 volume percent hydrogen and about 1 volume percent hydrogen sulfide. The feed gas mixture is passed through the reactor containing the catalyst at a rate such as to maintain an exit dry gas product rate of 2700 volumes per volume of catalyst per hour as measured at room temperature and atmospheric pressure (standard conditions). This feed gas mixture is initially passed over the catalyst at the above rate for about 110 minutes at 250° F. and at atmospheric pressure. Thereafter, the catalyst bed is gradually heated from 250° F. to 625° F. over a period of about 135 minutes. During this period, the catalyst is continuously contacted with the feed gas mixture at the rate indicated at atmospheric pressure. The 625° F. temperature level is then maintained for an additional 130 minutes while continuing the contacting of the catalyst with the gas mixture at atmospheric pressure. Thereafter, the reaction zone pressure is raised to 75 lbs. per square inch (p.s.i.g.) and the feed gas introduced into the system at 625° F. for 30 minutes at a gas rate of about 4200 volumes of feed gas at standard conditions per volume of catalyst per hour. The reactor is then pressurized to 550 p.s.i.g. and the feed gas introduced in the previously described rate for an additional 60 minutes. Finally, steam is admixed with the feed gas at a rate of about one mole of steam per mole of dry product gas and the temperature of the system maintained at 550 p.s.i.g. and 625° F.

The process is preferably carried out continuously. The gaseous hourly space velocity can vary within wide limits. Gaseous hourly space velocities between 300 and 30,000 volumes of feed per volume of supported catalyst per hour (v./v./hr.) measured on the basis of dry gas under standard conditions are particularly suitable for most applications. The process may be carried out at higher gaseous hourly space velocities if desired.

Water gas shift reactions are well known. The total amount of steam according to the present invention, i.e., the combined amounts in synthesis gas feed line 15 and steam line 18, is in the range of about 0.5 to about 100, preferably 1.5 to 25 volumes of steam per volume of carbon monoxide. The pressure is preferably in the range of 200 to 1500 pounds per square inch gauge (p.s.i.g.), although it may vary from atmospheric to 3,000 p.s.i.g. or more. However, the exact pressure and temperature conditions must be maintained above the dew point of the steam in the mixture. The temperature and pressure of the reaction mixture in contact with the process catalysts, in particular the alkali containing catalyst, are maintained such that the temperature is above the dew point temperature of the mixture and pressure is below the dew point pressure. The process is particularly effective when the feed contains minor amounts of sulfur ($H_2S$, organic sulfides, etc.). In fact, the presence of small amounts (0.01 to 200 v.p.p.m.) of sulfur in the feed actually results in increased conversions in many cases. If necessary the catalyst may be regenerated by oxidation and resulfiding.

The carbon monoxide content of the shifted synthesis gas can be controlled by appropriate choice of steam quantities and process conditions. The catalyst system of the present invention makes it possible to obtain very low outlet CO concentrations without excessive steam consumption.

The present process achieved high conversion to hydrogen with far less steam consumption than do processes using conventional high temperature water gas shift catalysts. Stated another way, the conversion attainable at a given steam consumption is far greater in the present process than in those processes using high temperature catalyst. At the same time, the present process takes advantage of the outstanding high temperature stability of the conventional high temperature catalyst, by using such a catalyst in at least the first conversion stage where a large temperature rise will usually occur.

What is claimed is:

1. A process for the preparation of hydrogen and carbon dioxide which comprises (a) contacting carbon monoxide and steam with a chromia-promoted ferric oxide catalyst to form a reaction mixture, said contacting being conducted at a temperature above the dew point temperature of the reaction mixture and in the range of about 600° to about 1000° F. and a pressure below the dew point pressure of the reaction mixture and in the range of about atmospheric to about 3000 p.s.i.g.; and (b) contacting at least a portion of the effluent from step (a) at a temperature above the dew point temperature of the reaction mixture and varying from about 200° to 700° F. and at a pressure below the dew point pressure of the reaction mixture and ranging from about atmospheric to about 3000 p.s.i.g. with a catalyst comprising (i) an alkali metal compound derived from an acid having an ionization constant of less than about $1 \times 10^{-3}$, and (ii) a hydrogenation-dehydrogenation component selected from the group consisting of (a) a metal composition comprising vanadium, molybdenum, tungsten, cobalt, tantalum or niobium materials or mixtures thereof or (b) mixtures of materials comprising a vanadium, molybdenum, tungsten, cobalt, tantalum or niobium materials or mixtures thereof with a nickel, iron or chromium material or mixtures thereof, the weight ratio of said hydrogenation-dehydrogenation component to said alkali metal compound, each calculated on the basis of the oxides thereof, being less than 5:1.

2. The process of claim 1 wherein said alkali metal compound is an alkali metal carbonate.

3. The process of claim 1 wherein said hydrogenation-dehydrogenation component is a mixture of cobalt and molybdenum materials.

4. The process of claim 1 wherein said carbon monoxide and steam additionally contain minor amounts of a sulfur material.

5. A process for the preparation of hydrogen and carbon dioxide which comprises (a) contacting carbon monoxide and steam with a chromia-promoted ferric oxide catalyst to form a reaction mixture, said contacting being conducted at a temperature above the dew point temperature of the reaction mixture and in the range of about 600° to about 1000° F. and a pressure below the dew point pressure of the reaction mixture and in the range of about atmospheric to about 3000 p.s.i.g. and (b) contacting at least a portion of the effluent from step (a) at a temperature above the dew point temperature of the reaction mixture and varying from about 200° to 700° F. and at a pressure below the dew point pressure of the reaction mixture and ranging from about atmospheric to about 3000 p.s.i.g., with a catalyst comprising (i) an alkali metal compound derived from an acid having an ionization constant of less than about $1 \times 10^{-3}$ and (ii) a hydrogenation-dehydrogenation component comprising (a) vanadium, molybdenum, tungsten or cobalt materials or mixtures thereof, or (b) mixtures of vanadium, molybdenum, tungsten or cobalt materials or mixtures thereof with nickel, iron or chromium materials or mixtures thereof, said catalyst contained on a support and at least a portion of said alkali metal compound or hydrogenation-dehydrogenation component being in a sulfide form, the weight ratio of said hydrogenation-dehydrogenation component to said alkali metal compound, each calculated on the basis of the oxides thereof, being less than 5:1.

6. The process of claim 5 wherein said hydrogenation-dehydrogenation component is a mixture of cobalt and molybdenum materials.

7. The process of claim 6 wherein said alkali metal compound is an alkali metal carbonate.

8. The process of claim 5 wherein said carbon monoxide and steam additionally contain minor amounts of a sulfur compound.

9. The process of claim 5 wherein said alkali metal compound is potassium carbonate or cesium carbonate.

10. The process of claim 5 wherein said chromia-promoted ferric oxide catalyst is employed in two reaction stages and additional steam is introduced into the reaction mixture between said first and second stages.

11. The process of claim 6 wherein said step (b) catalyst comprises from about 1 to about 5 wt. percent cobalt material, from about 5 to about 15 wt. percent molybdenum material, each based on total catalyst, and potassium carbonate, said cobalt material, molybdenum material and potassium carbonate contained on an alumina support.

12. The process of claim 1 wherein said alkali metal compound is potassium carbonate or cesium carbonate.

13. The process of claim 12 wherein said step (b) catalyst is contained on a porous, inorganic oxide support.

14. The process of claim 7 wherein said support is a porous, inorganic oxide.

15. The process of claim 6 wherein said alkali metal compound is potassium carbonate or cesium carbonate.

References Cited

UNITED STATES PATENTS

| | | | |
|---|---|---|---|
| 3,392,001 | 7/1968 | Lorenz et al. | 423—656 |
| 3,441,393 | 4/1969 | Finneran et al. | 48—197 |
| 3,529,935 | 9/1970 | Lorenz et al. | 423—437 |

FOREIGN PATENTS

| | | | |
|---|---|---|---|
| 940,960 | 11/1963 | Great Britain | 252—373 |
| 961,860 | 6/1964 | Great Britain | 23—213 |

EDWARD STERN, Primary Examiner

U.S. Cl. X.R.

423—656, 655; 252—439, 467, 475, 474, 476